Don A. Norman
Lowell E. Wilkerson
William G. Matheny
INVENTORS

BY John F. Miller
Agent

Attorney

| Fig. 4a |
| Fig. 4b |
| Fig. 4c |
| Fig. 4d |

Don A. Norman
Lowell E. Wilkerson
William G. Matheny
INVENTORS

BY John F. Miller

Attorney

United States Patent Office

3,508,346
Patented Apr. 28, 1970

---

3,508,346
AUDIO VISUAL INSTRUCTIONAL APPARATUS
Don A. Norman, Lowell W. Wilkerson, and William G. Matheny, Fort Worth, Tex., assignors, by mesne assignments, to the United States of America
Filed Nov. 24, 1967, Ser. No. 685,666
Int. Cl. G09b 9/08
U.S. Cl. 35—12                                    4 Claims

---

ABSTRACT OF THE DISCLOSURE

A tape controlled training device provides a programmed sequence of visual and/or audio information in separate units or "frames" to earphones and a rear projection screen at a student's console. Each frame may comprise a visual and/or audible problem requiring analysis and manual or oral response by a student. A unique and exclusive "correct response" circuit between a student's controls at the student's console and indicators at an operator's console is established prior to the presentation of each frame of information. Depending on programing, the device may automatically furnish corrective or supplementary instruction to the student when an incorrect responce is made. Counting, timing, indicating, and scoring means are provided at the operator's console for evaluating a student's response. An overriding control enables an operator to alter the programmed information at will during a sequence.

---

BACKGROUND OF THE INVENTION

The invention is in the field of training and testing devices. In the prior art elaborate and expensive devices have been used to train and/or test personnel in the operation of complex machines such as aircraft, spacecraft, etc. For example, to train aircraft pilots to quickly scan an instrument panel and to promtly take any required corrective action has heretofore required a simulated aircraft with elaborate auxiliary equipment. No simple and inexpensive apparatus for training pilots in complex procedures has been available.

SUMMARY OF THE INVENTION

The invention comprises an operator's console, a student's console having a rear projection screen, a projector, a tape recorder, and connecting circuitry which enables an operator to store a selected program of audio informa- and control instructions on a tape. The programmed tape may then be played back to control the apparatus to present selected frames of information in sequenced order to a student. The student may respond to the information verbally through a microphone or manually by operating a switch (in the disclosed embodiment, a simulated control stick) to one of several positions. The students' response is communicated to an operator at the operator's console who may evaluate and record a verbal response. Additional instruction, e.g., corrective information, may optionally be presented to the student when he has made a response. This is done immediately and automatically. The apparatus may be employed in a similar manner for testing rather than for training.

DESCRIPTION OF THE PREFERRED EMBODIMENT

Figure 1:
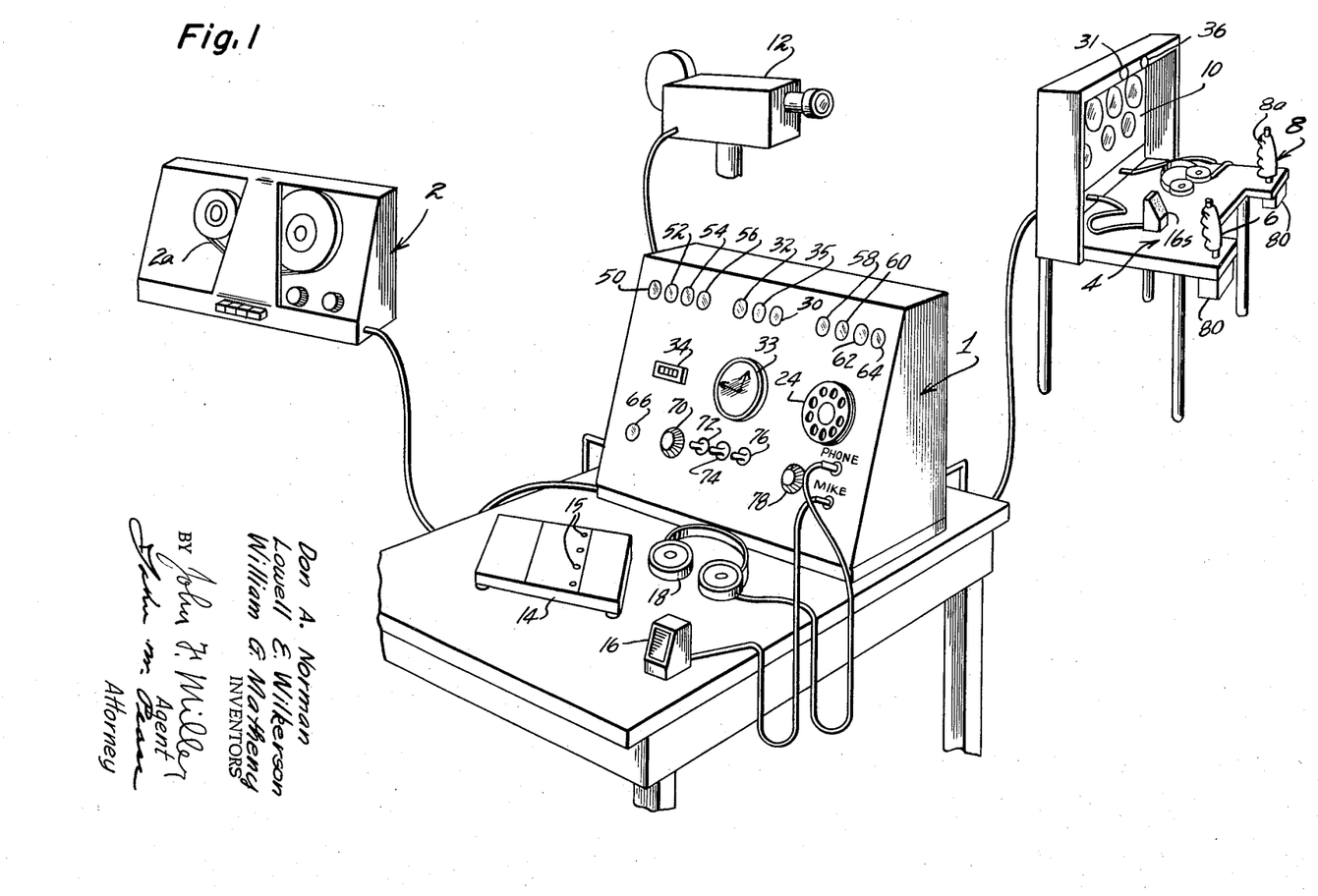
FIG. 1 shows the arrangement of the principal elements of the apparatus.

FIG. 1 shows the principal elements of the invention comprising an operator's console 1 connected to a tape recorder 2 and to a student's (or subject's) console 4 having a simulated stick control 8 and a throttle control 6. A back-lighted screen 10 is illuminated by a projector 12. Station 4 and projector 12 are connected to operator's console 1 by cables. The terms "student" and "subject" are used interchangeably here to emphasize the multiple utility of the apparatus which may be used both for training and for testing personnel. A microphone 16, earphones 18, and an indicating and scoring board 14 are adapted to be plugged into jacks in console 1.

To use the device, an operator turns switch 70 to "record" mode position and records information on a tape 2a in tape recorder 2 using microphone 16 and a dial switch 24. After the information is recorded, the apparatus may be switched to a "playback" mode wherein the tape is played back to control the apparatus. The recorded information may comprise a channel of control bits on the tape which pulse stepping switches to sequence the circuits of the apparatus and a parallel channel of audio information for instructing the student. During a playback operation the first control bits on the tape which pass under a reading head furnish impulses to step a stepping switch to establish a preselected correct response circuit between one of switches 6 or 8 and correct response indicator light 30 on operator's console 1 and correct response light 31 on student's console 4. Clock timer 33 on console 1 is reset to zero and any of a plurality of indicator lights 15 on scoring board 14 which might be illuminated are extinguished. A correct response light 30 or an incorrect response light 32 on console 1 is turned off. A frame counter 34 is stepped one time and the slide changer on a projector 12 is advanced. Circuits are established to provide audio instruction, audio and visual instruction, or no instruction, and a "get ready" light 36 on student's console 4 warns the student that a problem will be presented in one second. Then the shutter of projector 12 is opened to project a picture of, for example, an aircraft instrument panel on screen 10 of console 4 and a timer 33 on console 1 starts. Projector 12 may be a slide or movie projector, or both may be provided. Depending on how the tape has been programmed the student after observing the instrument readings presented on screen 10 may make a manual response by moving one of switches 6 or 8 or the student may respond by speaking into a microphone 16. If a response is made this causes timer 33 to stop and the shutter of projector 12 to close. Either correct response lights 30 and 31 are turned on or incorrect response light 32 is turned on either automatically or by the instructor when operating in the "VOX" mode. One of indicator lights 15 on scoring board 14 is illuminated automatically when operating in the manual response mode, indicating a particular response to the problem. The control switches 6 and 8 or a "VOX" relay, not shown, are deactivated. If operating in the VOX mode the student's verbal response through microphone 16s is channeled to the operator's headset 18. If the verbal response is correct the operator depresses a "VOX CORRECT" push button 66 on console 1 to activate correct response light 31 on student's console 4. Switch 8 has a push button 8a mounted on top to be thumb operated by the student if the problem presented requires "no response," that is, no correction movement of stick or throttle. If "no response" is required then operation of 8a will result in a "correct response" indication. But if the problem requires corrective movement of stick or throttle and the student fails to respond within the time fixed by one frame, the timer 33 is stopped, the shutter of projector 12 is closed and switches 6 and 8 or the VOX relay are deactivated as applicable.

The student may now receive additional instruction if his response was incorrect, or he may receive additional instruction regardless of the correctness of his response, depending on the program. The shutter of projector 12 is always open for the additional instruction so that the student receives visual and audio instruction. The tape may have been programmed to provide additional instruction only if an incorrect response is made. The operator may override the taped program to provide additional instruction regardless of the correctness of the response if it is deemed desirable. This is accomplished by closing a post audio visual switch 72 on console 1. The immediate automatic transmission of corrective instruction to a student making an incorrect response greatly accelerates the student's learning process and is a principal advantage of the invention. The apparatus recycles to the reset position for the next frame. A prepared scoreboard sheet is aligned with the scoreboard 14 and a mark is made in a square on the sheet over a light on the scoreboard to record the student's response.

The indicators and instruments mounted on the operator's console 1 will be described in connection with a typical recording or programming operation. This involves recording a program on a tape 2a on tape recorder 2. Tape 2a may then be played back at any time to control the apparatus. The operator will first reset a frame counter 34 to zero. Frame counter 34 is automatically advanced during playback each time a frame of information is presented. "Frame" as used here refers to a single unit of information such as a picture of an aircraft instrument panel shown on screen 10 and the corresponding audio information presented therewith. Depending on the programming, the audio information alone or with the visual display may be presented before the student has an opportunity to respond, and additional audio information together with the visual display may follow the opportunity to respond. Mode switch 70 is turned to the "record" position. Now a power switch 74 is turned on and logic light 58 will be illuminated. If 58 fails to light, this indicates that some element has not been reset, so the operator will depress a reset button on the back of console 1 to clear the apparatus. When logic light 58 is on, it indicates that the circuitry is prepared to record programming signals on tape 2a. VOX gain control 78 is adjusted for a suitable audio volume and the tape recorder 2 is started. A control code is recorded by dialing dial wheel 24 in accordance with the logic of Table I. This records programming information on tape 2a which during playback will cause a specific correct response circuit to be established which is appropriate to the problem to be presented in the first frame. When the correct response has been programmed, pre-audio visual indicator 60 will light. Thereupon the operator will dial programming information which is recorded on tape 2a to determine whether during playback and prior to presentation of the first picture problem, audio, audio and visual, or no information, is to be presented. Table II shows the logic employed. If preliminary audio information is to be programmed, when a record audio indicator 64 lights signifying that the microphone 16 is on, the operator records the audio information using microphone 16. When the recording is completed the operator will dial an "end record" signal. During a playback of tape 2a a timer 33 starts when the "end record" signal is read. Therefore, it is necessary during the recording of a program to dial an "end timing period" command. At this time a "post audio visual" indicator 62 will light signifying that a signal should be dialed to establish whether post audio information or no post audio information is to be recorded for playback after the problem presentation. If post audio is to be programmed the operator records the text and then dials an "end record" signal which also signifies the end of the first frame.

This completes the programming of the tape for the first frame. The procedure is repeated for as many frames as desired. When it is desired to present an "information only" frame, which requires no response, a "skip frame" is used which presents audio or audio and visual information and omits any opportunity for the student to respond.

Other indicators and controls shown in FIG. 1 are a reset indicator 50 which is lighted when all the circuits of the apparatus are properly reset. Indicators 36 and 52 are "get ready" signals operated to indicate that a problem or information is about to be presented. Indicator 54 is lighted when the shutter of slide projector 12 is open. Indicator 56 is lighted when the student's or subject's headset is on to receive taped audio information. Correct response button 66 is pressed by the instructor to turn on the correct response light 31 on the student's console 4 when the apparatus is programmed so that the student must respond to a problem by speaking into his microphone. Indicator light 35 is provided to indicate when VOX gain control 78 is properly adjusted. Switch 74 is a power switch for the entire apparatus and switch 76 is used to turn on the motor of the movie projector so that the instructor may synchronize the movie with the tape recording.

TABLE I

| Correct Response | Dial |
|---|---|
| Throttle, No Change | 1 |
| Throttle, Forward | 2 |
| Throttle, Aft | 3 |
| Stick, No Change | 01 |
| Stick, Forward | 02 |
| Stick, Fwd.-Right | 03 |
| Stick, Right | 04 |
| Stick, Aft-Right | 05 |
| Stick, Aft | 06 |
| Stick, Aft-Left | 07 |
| Stick, Left | 08 |
| Stick, Fwd.-Left | 09 |
| Skip Frame (no response) | 00 |
| VOX Response (all cases) | 01 |

TABLE II

*See Logic Table I

Figure 2:
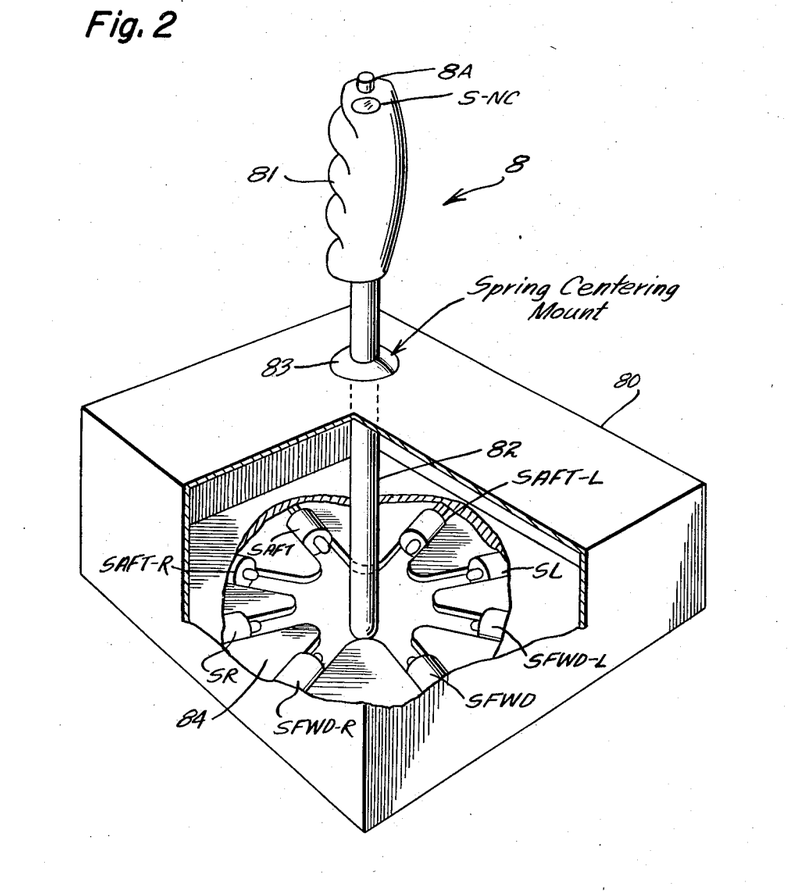
FIG. 2 shows a stick control switch 8 of switch 1.

FIG. 2 shows stick control switch 8 of FIG. 1. Switch 8 comprises a supporting case 80 for supporting handle 81 on a shaft 82 in a spring centering mount 83. An eight petaled flower shaped cutout is provided in the bottom 84 of case 80 which serves as a guide for the lower end of movable shaft 82. When handle 81 is moved to any one of eight positions by a student in response to a problem, the lower end of shaft 82 is guided by the cutout to activate one and only one of the push button switches S–AFT (stick aft), S–FWD (stick forward), S–AFT–L (stick forward and left, S–R (stick right), etc. Push button 8A is depressed by the student to close contacts S–NC when the problem requires no control movement of the stick. Throttle control 6 of FIG. 1 is a switch similar to switch 8 except that it has only three contacts, Contact T–NC (throttle-no control), T–FWD, and T–AFT.

Figure 3A:
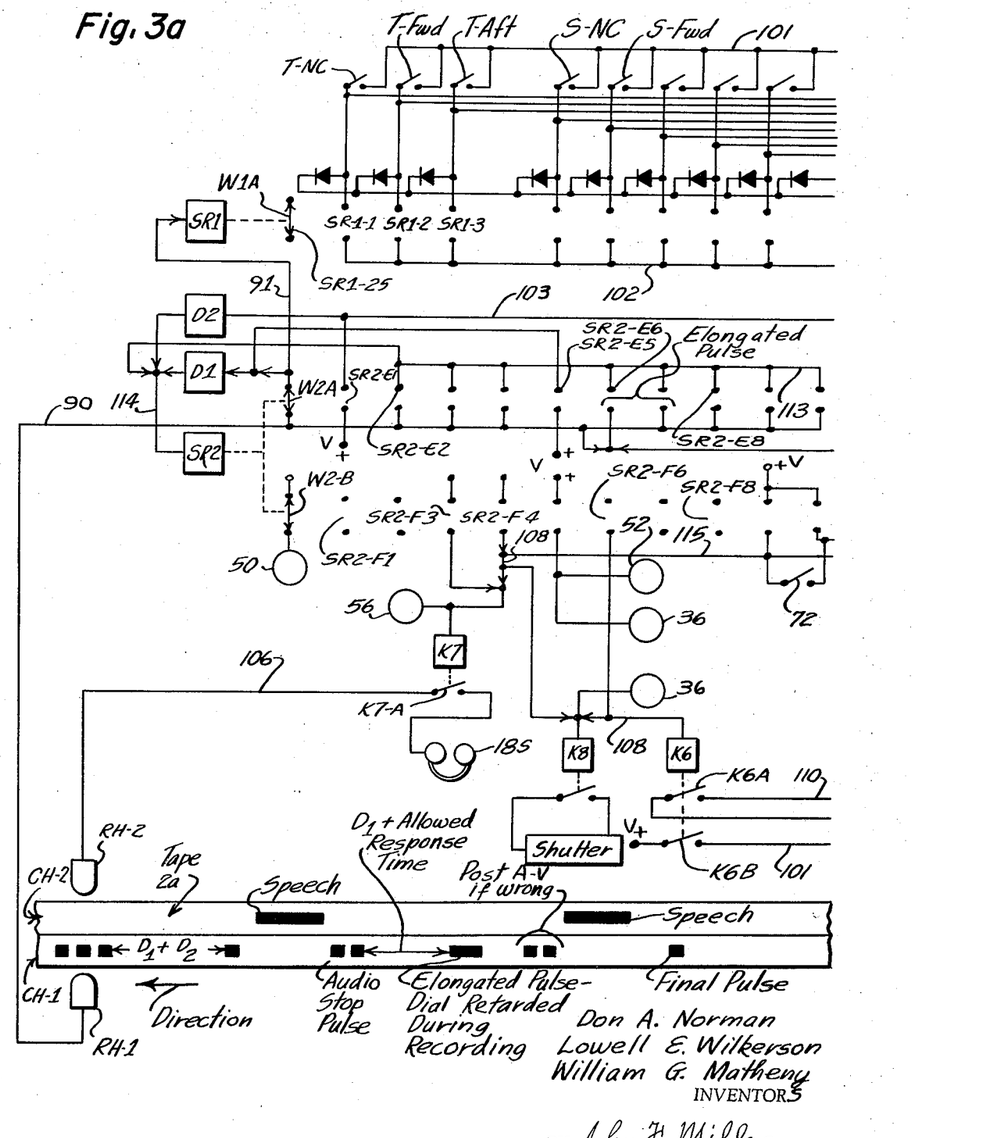
FIGS. 3a and 3b show a functional block diagram of the invention illustrating one mode of operation.
Figure 3B:
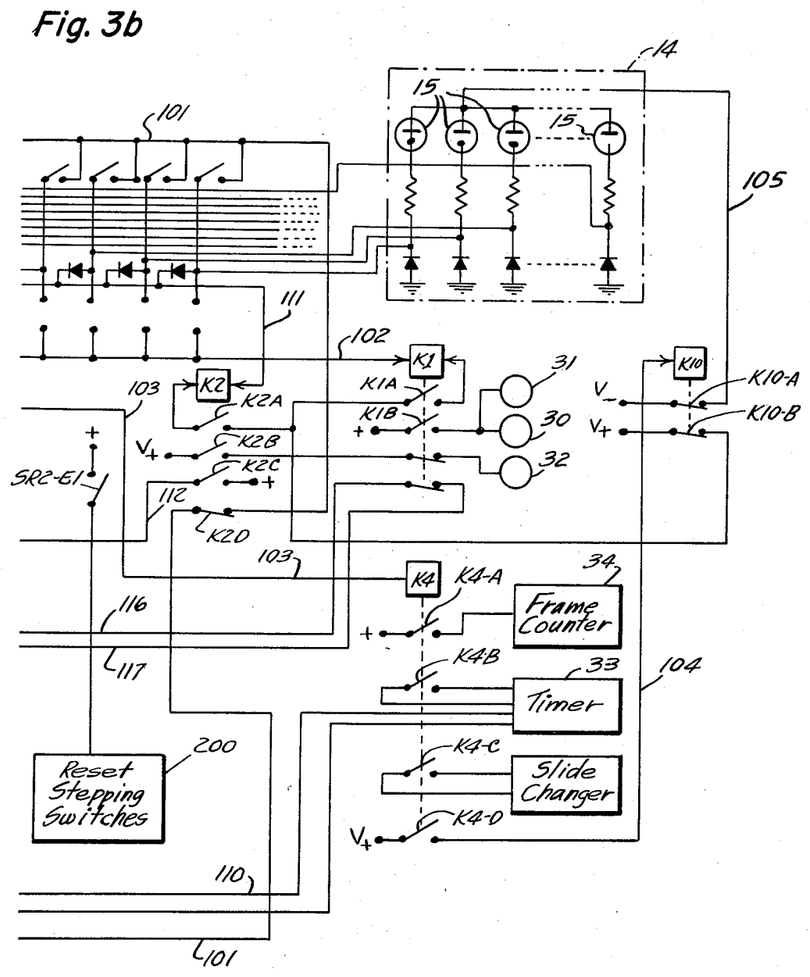
Figure 4A:
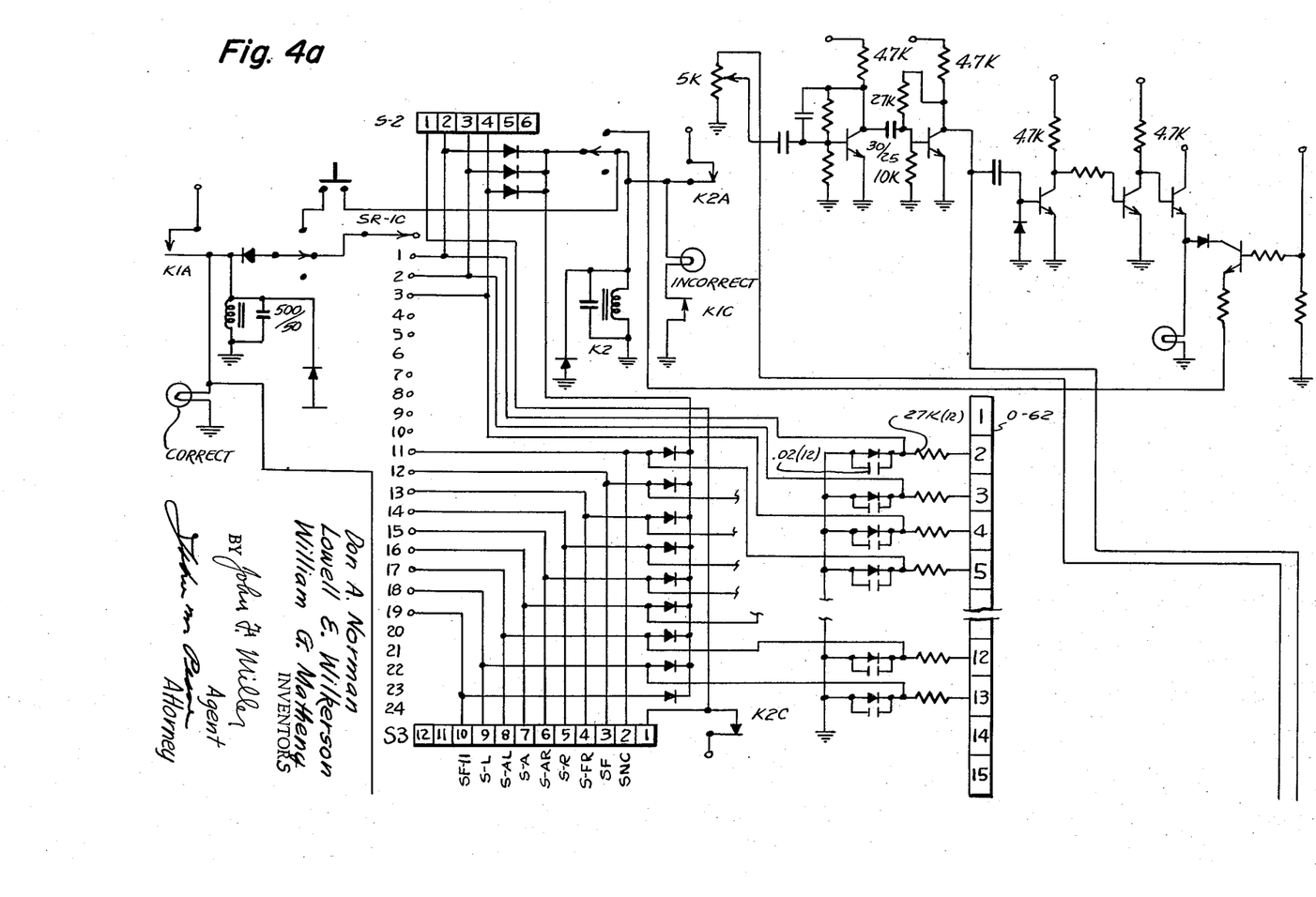
FIGS. 4a, 4b, 4c, and 4d show an actual circuit schematic of the invention.
Figure 4B:
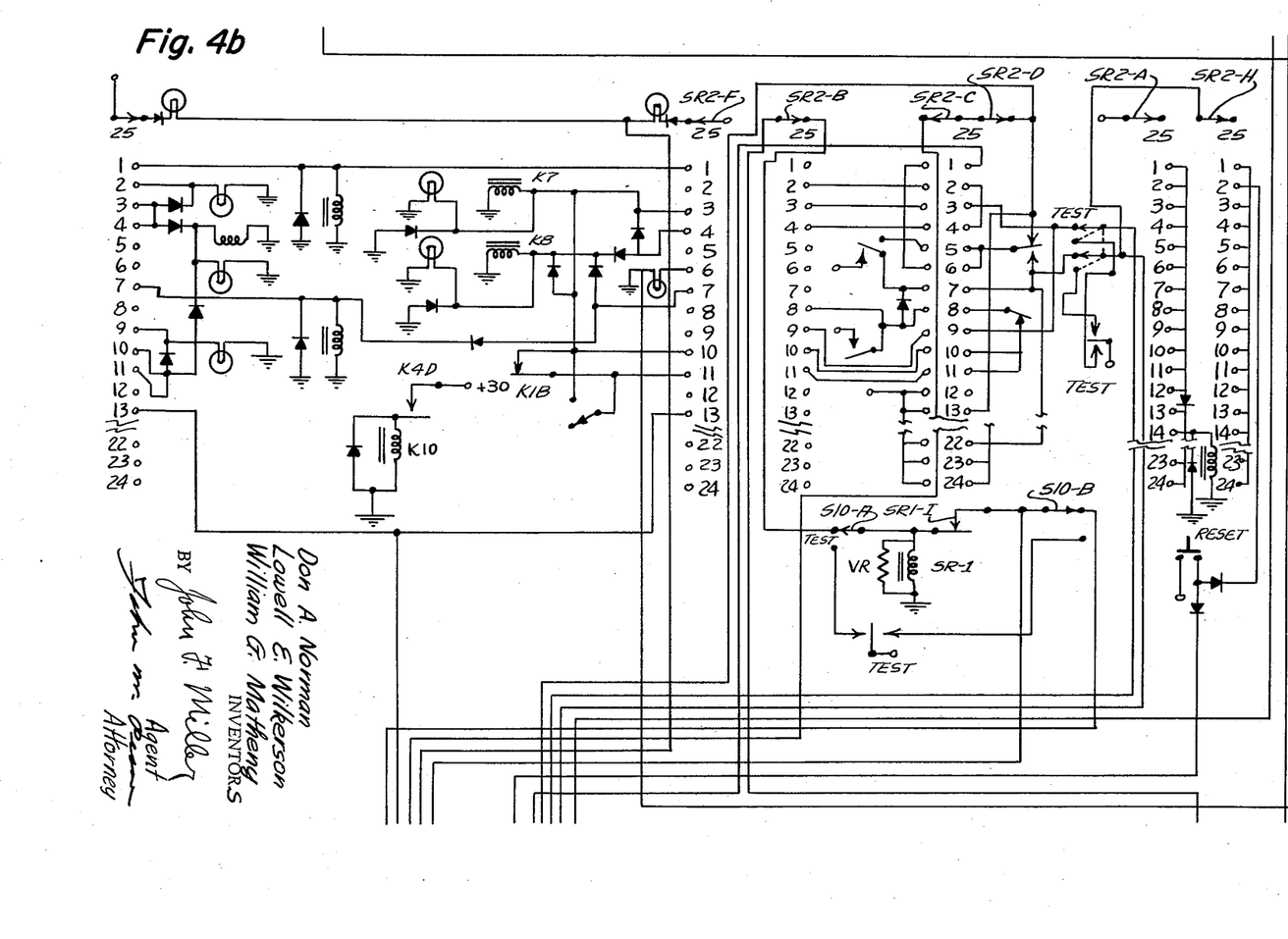
Figure 4C:
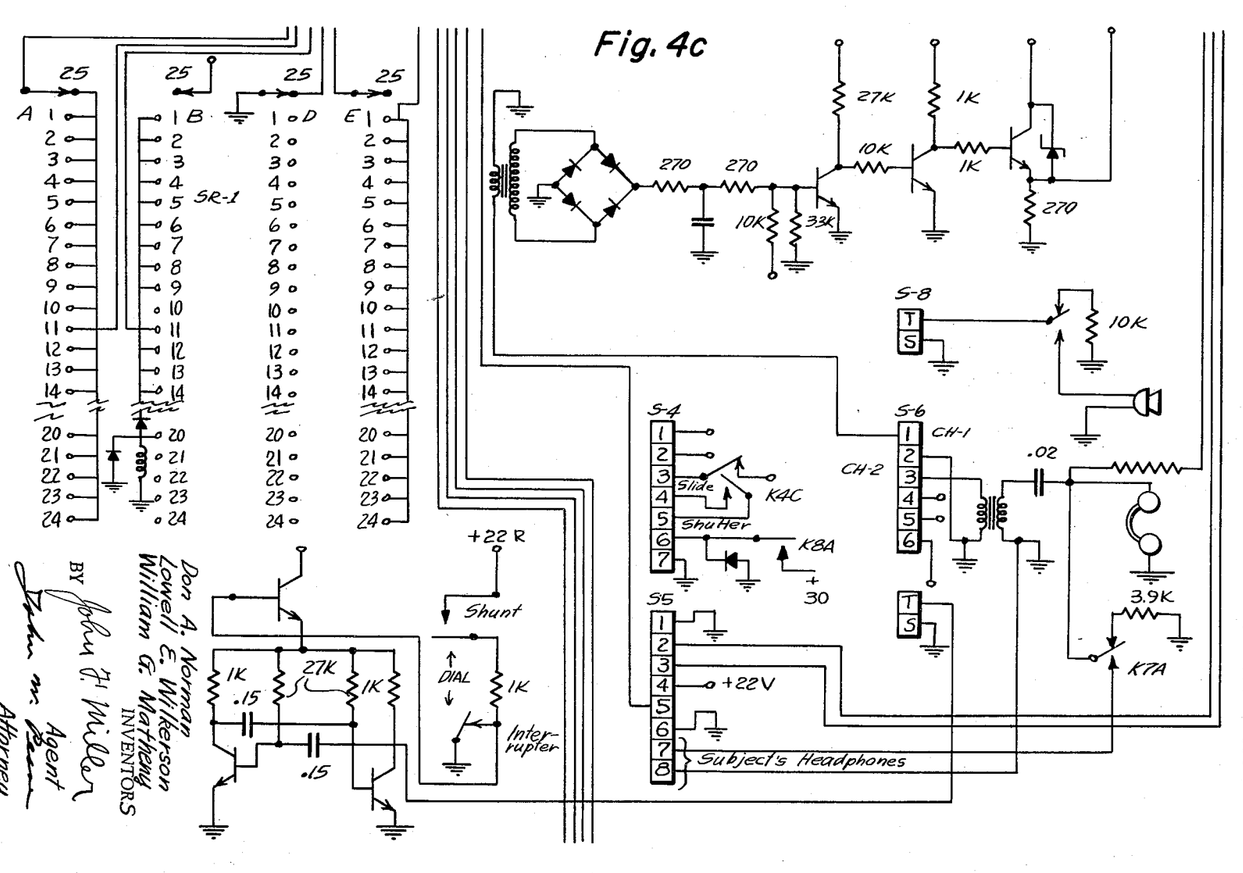
Figures 4D, 4E:
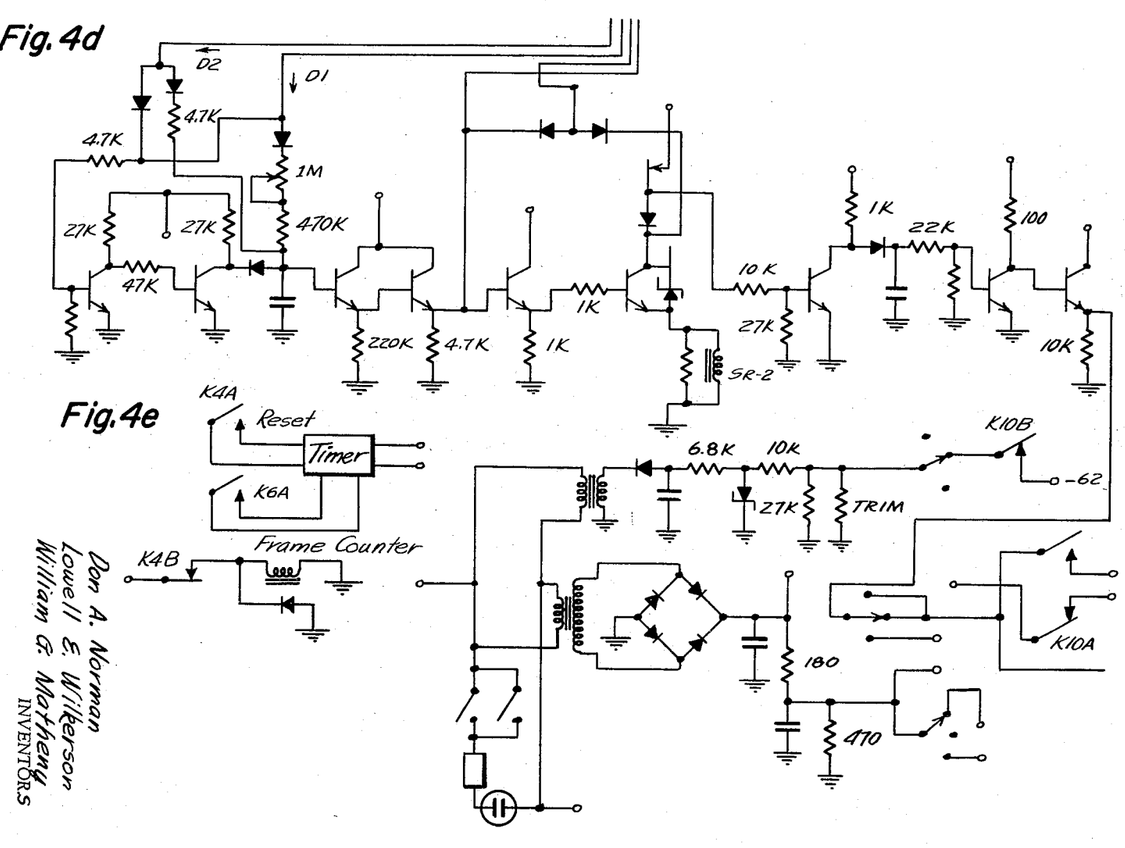

FIG. 3 is a simplified block diagram designed to illustrate the operation of the invention when a student is responding manually to the information presented on slides. In FIG. 3 tape 2a is moving from right to left under reading heads RH–1 and RH–2 which read channels CH–1 and CH–2 respectively. Channel CH–1 has groups of pulses and channel CH–2 has speech recorded respectively thereon in the manner noted in the explanation of FIG. 1 above. Two stepping switches SR1 and SR2 initially have respective wipers W1A, and W2A and W2B resting on the home contacts shown and reset light 50 is lighted. The first group of pulses on channel CH–1 comprises the correct response information and when this passes under reading head RH–1 the pulses derived therefrom pass over line 90, the home contacts of wiper W2A and line 91 to cause stepping switch SR1 to step, in this case, three times. This establishes a correct response circuit from a positive voltage source V+ through relay contacts K6B, line 101, a throttle switch T–AFT, wiper W1A and contacts SR1–3, line 102 and ground at K1.

All relays K1, K2, ets., stepping switches, lights, and other elements are grounded to frame members not shown in FIG. 3. However, this correct response circuit is not completed at this time because contacts K6B are open and so are all of the student response switches including throttle switch T–AFT. Shortly after SR1 has finished stepping a pulse reaches stepping switch SR2 after having been delayed by delay circuit D1. This first pulse causes SR2 to step once, moving wipers W2A and W2B to their second positions bridging contacts SR2–E1 and SR2–F1. W2A establishes a circuit from V+ through contacts SR2–E1 and line 103 to relay K4 which is actuated to close contacts K4A, K4B, K4C and K4D, thereby advancing frame counter 34, resetting timer 33, actuating slide changer 12a of projector 12 (FIG. 1), and establishing a circuit from V+ over line 104 to actuate relay K10. K10 opens contacts K10A and K10B thereby opening the circuit from V+ through line 105 to response indicator lights 15 and from V+ to K1 and K2 over latch contacts K1A and K2A. K1 and K2 unlatch thereby opening contacts K1B and K2B to extinguish any of the operator's correct light 30, the student's correct light 31, or the operator's incorrect light 32 which might be on. Now a pulse arrives through delay circuit D2 to step SR2 once to cause wiper W2A to bridge contacts SR2–E2 so that a second group of pulses recorded on channel 1 may now be forwarded from reading head RH–1 to step SR2. This second group of pulses may consist of one, two or three separate pulses. If one pulse is received, SR2 will step once, wiper W2B will close contacts SR2–F3 to turn on audio light 56 and actuate relay K7 which then connects the student's headset 18s to reading head RH–2 through contacts K7A and line 106. This allows the student at console 4 (FIG. 1) to hear any verbal instructions or other information picked up by RH–2 from channel CH–2.

If two pulses are recorded in the second group this means that both audio and visual information is to be supplied to the student. In this case SR2 steps twice causing wiper W2B to bridge contacts SR2–F4 to actuate relays K7 and K8 thus connecting the student's headset, opening the shutter of projector 12 and turning on indicator lights 54 and 56 to inform the operator that the student's headset is connected to reading head RH–2 and that the shutter of projector 12 is open to project a slide on the screen 10 of console 4.

If three pulses are recorded in the second group, then SR2 steps three times positioning its wipers W2A and W2B on contacts SR2–E5 and SR2–F5 to energize delay D1 and the instructor's and student's "get ready" lights 52 and 36. After the delay D1 stepping switch SR2 steps once moving wipers W2A and W2B to contacts SR2–E6 and SR2–F6 which energizes relay K8 via line 108 to open the shutter or projector 12 thus projecting a picture of an aircraft instrument panel on screen 10 of student's sole 4.

K6 is also energized to start timer 33 over contacts K6A and line 110 and to supply power from V+ over contacts K6B, K2D, and line 101 to response switches T–NC, T–FWD, etc. This prepares the circuit to receive the student's response.

If there are less than three pulses in the second group of pulses recorded in channel CH–1 of the tape 2a, one, or two additional pulses are recorded on the tape as a third "group" so that a total of three pulses are recorded to cause the above listed events to occur which prepares the circuit to receive a response from the student.

Now the student after observing the problem presented by the instrument readings in the picture presented on the screen 10 of console 4 may respond by manipulating throttle control 6 or stick 8 (FIG. 1). If the problem requires no corrective movement of the stick or throttle a push button 8a on top of stick 8 or push button 6a on top of stick 6 must be depressed by the student to complete the "correct" response circuit.

Assuming, for illustration, that the problem presented in a particular frame requires movement of the throttle control to the rear, channel CH–1 on tape 2a will have been coded so that stepping switch SR1 will have stepped to move its wiper W1A to contacts SR1–3 in FIG. 3. Then if the student makes the correct response by moving the throttle control to the rear this will close switch T–AFT completing the previously traced circuit from V+ through contacts K6B, K2D, lines 101 and 111 to relay K2 which is actuated and latched, closing contacts K2B to complete a circuit from V+ to light the instructor's incorrect response light 32, breaking the power circuit to the control switches at contacts K2D to preclude a second response by the student and stepping SR2 one step by supplying power from V+ over contacts K2C, line 112, wiper W2A of SR2 and lines 113 and 114. When SR2 steps it disconnects power from the shutter of projector 12 (FIG. 1) and timer 33 thus stopping the timer and the visual display on screen 10. However, at the time that K2 is actuated K1 is actuated and latched by the same power circuit over switch T–AFT, the wiper of SR1, and line 102. This turns off the instructor's incorrect light by breaking the power circuit at contacts K1C and turns on the operator's correct response light 30 and the student's correct response light 31. Since K2 and K1 are actuated simultaneously the incorrect response light is not on long enough to become visible.

But if the student moves the controls to actuate some switch other than T–AFT, a circuit will be completed from V+ through K6B, K2D, line 101, the selected control switch, one of the diodes connecting the control switches to line 111, and line 111 to relay K2 which will be actuated to break the power circuit to the control switches at K2D and to establish a hold circuit for itself across K2A and a circuit across K2B from V+ to the instructor's "incorrect response" light 32 on panel 4 (FIG. 1). SR2 is stepped one step thus stopping timer 33 and closing the shutter of projector 12. Whichever control switch is closed by the student's response is identified on scoreboard 14 by one of connected lights 15. These lights are arranged in an ordered array so that the operator can place a ruled translucent scoresheet over the lights on board 14 and keep score by making a check mark in a ruled square which is over a lighted indicator light. Scoreboard 14 may be made of clear plastic or similar material with the lights imbedded therein or placed underneath to provide a smooth surface for the scoresheet.

A single long pulse, long enough to advance SR2 two steps is recorded on channel CH–1 of tape 2a, and this pulse causes SR2 to advance one step. However, if the student has failed to make a response so that the wipers of SR2 are still on the contacts, the long pulse from reading head RH–1 causes SR2 to step two steps to contacts SR2–E8 and SR2–F8.

A fifth group of pulses in channel 1 now comes under reading head RH–1. The fifth group consists of one, two, or three pulses. If the fifth group contains only one pulse, wiper W2B of SR2 is stepped one step to contacts SR2–F9 which connects V+ across W2B to lines 115 and 108 to actuate K7 and K8 thus connecting the student's headset and opening the shutter of projector 12. This enables the operator to present additional instruction or information in both audible and visual form to the student.

If two pulses are recorded in the fifth group moving wiper W2B of SR2 to contacts SR2–F10 the same thing happens, that is, the shutter is opened and the student's headset is connected. However, if K1 has been energized by a correct response the circuit to energize relays K7 and K8 is broken at contacts K1D since there is no need to give the student additional instruction. However, the operator may override this circuit break by closing the post audio visual switch 72 bridging lines 116 and 117 to give the student additional information notwithstanding the correct answer.

If three pulses are recorded in the fifth group, SR2 is caused to step to contacts SR2–E11 and SR2–F11 closing a circuit over wiper W2A from + to a resetting circuit 200 which resets both SR1 and SR2 to their original positions on home contacts SR1–25, etc.

There may be a sixth group of pulses recorded in channel 1. There will be two pulses in the sixth group if the fifth group contained only one pulse. There will be only one pulse in the sixth group if the fifth group contained two pulses. There will be no pulses in the sixth group if the fifth group contained three pulses because the sixth group is provided only to move SR2 to the last set of contacts in case the fifth group contains an insufficient number of pulses to do so.

Figure 5:
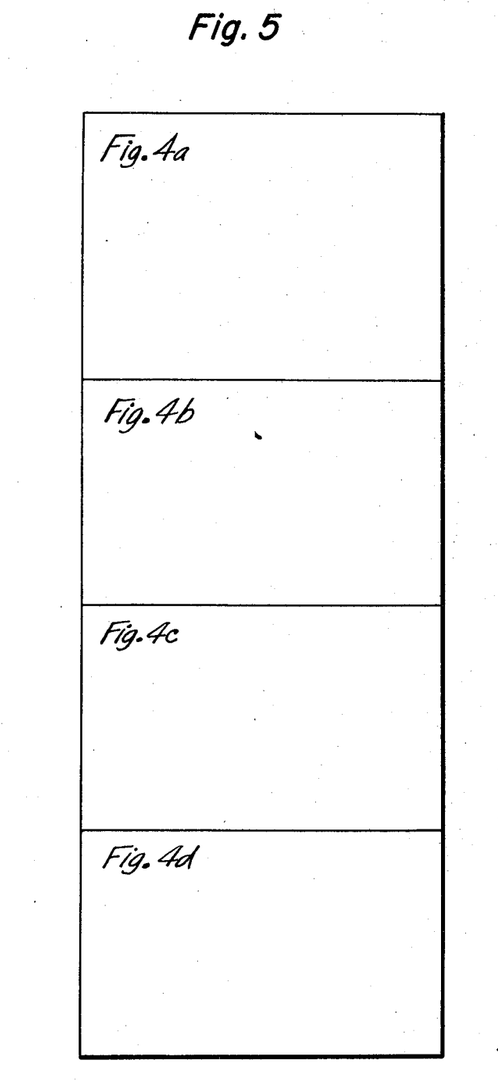
FIG. 5 shows how FIGS. 4a through 4d should be combined.

FIGS. 4a, 4b, 4c, and 4d, when combined as shown in FIG. 5 comprise a circuit diagram of the invention. It shows the circuits and component values used so as to enable a person skilled in the art to build the invention without experimentation. For example, FIG. 4 shows stepping switches SR1 and SR2 as multi-layer stepping switches, each having several layers of contacts. Note that SR1 has five layers or wafers SR1–A, SR1–B, SR1–C, SR1–D, and SR1–E. This is the construction actually used in the preferred embodiment. The connections of the switch contacts and other elements will be obvious to those skilled in the art.

A primary advantage of the relatively simple apparatus disclosed is that it enables the economical presentation to a student pilot of a programmed sequence of progressively more difficult frames of instruction arranged to teach specific patterns of instrument checking and the avoidance of common interpretive errors by aircraft pilots. This training has become extremely important because of the drastic increase in aircraft speeds and complexity, and the explosion in air transportation. The tremendous speeds of current and projected aircraft do not permit pilot errors which would have been inconsequential in yesterday's planes. The apparatus is of equal value in testing experienced pilots. The student pilot's learning process is greatly aided by the immediate feedback of corrective information when he has made a mistake. This pointing out of what he should have done while showing him the same slide again requires no intervention by the instructor, and makes for a better and quicker understanding by the student. This enables the teaching of the same matter to all of a group of students who will each be approximately equally well trained at the end of a training program. The invention may be operated by a relatively unskilled instructor to teach complex and sophisticated subject matter. A skilled instructor is required only for the initial programming of the invention. The invention is not limited to the disclosed feedback of audio information while displaying the same visual information. The "feedback" principle could be expanded to include the feedback of additional visual and audio information, a repeating or expansion of any previously supplied information, or any other information should the nature of the student's response make such further instruction desirable. Depending on programming, an entire sub-program of additional instruction could be transmitted to a student whose response revealed a need for such additional instruction.

Many modifications of the invention will be apparent to those skilled in the art from the above disclosure. It should therefore be understood that the invention is not confined to the disclosed embodiment but is limited only by the following claims.

We claim:

1. In an audio visual training device, the improvement comprising:
apparatus including an operator's console, a student's console, a projector, a recorder, means at said operator's console to record programming and audio information, means for playing back said record to control said apparatus to present visual and audio information at said student's console, means located at said student's console whereby a student may make an oral or a manual response to said information, means for evaluating the response of said student to said information, said means for evaluating the response of said student including timing means, counting means, indicating means, and means for recording said student's responses, said means for making a manual response to said information comprising multi-contact switch means arranged to simulate the control stick and the throttle lever of an aircraft, said means for making an oral response comprising microphone and headset means and switch means for automatically interconnecting said microphone and headset means at selected times only, switching means for establishing a correct response circuit whereby a correct response will actuate a correct response indicator at said operator's console and any incorrect response will operate an incorrect response indicator at said operator's console, means responsive to said incorrect response to automatically feed back corrective instruction to said student's console whereby a student is immediately apprised of the correct response to said audio and/or visual information.

2. The apparatus of claim 1, wherein
said switching means for establishing a correct response circuit are controlled by said programming information on said record and said means for making a manual response include switch means to be activated by said student when the correct response to particular information requires no movement of said control stick or of said throttle lever.

3. The apparatus of claim 2,
said switching means for establishing a correct response circuit including means for preventing a second response by said student to a single frame of information.

4. The apparatus of claim 2, and including
manual override means at said operator's console whereby said programming information may be overridden to present repeat information and supplementary information to said student's console regardless of the state of said correct response circuit.

References Cited

UNITED STATES PATENTS

| 2,350,351 | 6/1944 | Grunberg | 35—12 |
| 3,069,789 | 12/1962 | Knight et al. | |
| 3,222,597 | 12/1965 | Beatenbough et al. | |
| 3,266,173 | 8/1966 | Sheridan | 35—11 |
| 3,266,174 | 8/1966 | Bechtol et al. | 35—11 |
| 3,310,884 | 3/1967 | Weitzman et al. | 35—12 |
| 3,427,732 | 2/1969 | Wopart | 35—11 X |

EUGENE R. CAPOZIO, Primary Examiner

W. H. GRIEB, Assistant Examiner